US006327898B1

(12) United States Patent
Harris

(10) Patent No.: US 6,327,898 B1
(45) Date of Patent: Dec. 11, 2001

(54) FUEL SYSTEM LEAKAGE DETECTOR

(75) Inventor: Robert S. Harris, Connersville, IN (US)

(73) Assignee: Stant Manufacturing Inc., Connersville, IN (US)

( * ) Notice: Subject to any disclaimer, the term of this patent is extended or adjusted under 35 U.S.C. 154(b) by 0 days.

(21) Appl. No.: 09/647,893

(22) PCT Filed: Apr. 14, 1999

(86) PCT No.: PCT/US99/08237

§ 371 Date: Oct. 6, 2000

§ 102(e) Date: Oct. 6, 2000

(87) PCT Pub. No.: WO99/53181

PCT Pub. Date: Oct. 21, 1999

Related U.S. Application Data

(60) Provisional application No. 60/081,670, filed on Apr. 14, 1998.

(51) Int. Cl.[7] ........................................ G01M 3/04

(52) U.S. Cl. ........................................ 73/49.2; 73/49.2

(58) Field of Search ........................................ 73/40, 40.5 R, 73/46, 47.2, 49.7, 118.1, 45.8; 340/605

(56) References Cited

U.S. PATENT DOCUMENTS

| | | | | |
|---|---|---|---|---|
| 2,847,851 | | 8/1958 | Enell . | |
| 2,940,301 | | 6/1960 | Hughes et al. . | |
| 2,940,303 | | 6/1960 | Enell . | |
| 3,014,361 | | 12/1961 | Black . | |
| 3,022,658 | | 2/1962 | Black . | |
| 3,138,949 | | 6/1964 | Pipes . | |
| 3,745,818 | | 7/1973 | Gaenzler . | |
| 3,807,219 | | 4/1974 | Wallskog . | |
| 3,872,712 | * | 3/1975 | Wetservelt et al. | 73/40 |
| 3,995,472 | * | 12/1976 | Murray | 73/40 |
| 4,235,100 | | 11/1980 | Branchini . | |
| 4,494,402 | * | 1/1985 | Carney | 73/40 |
| 4,497,290 | | 2/1985 | Harris . | |
| 4,523,452 | * | 6/1985 | Brayman | 73/40 |
| 4,686,851 | | 8/1987 | Holm et al. . | |
| 4,794,790 | | 1/1989 | Metaxa et al. . | |
| 4,796,676 | * | 1/1989 | Hendershot et al. | 141/83 |
| 4,993,256 | | 2/1991 | Fukuda . | |
| 5,158,054 | | 10/1992 | Otsuka . | |
| 5,182,941 | * | 2/1993 | Frenkel et al. | 73/40 |
| 5,239,858 | * | 8/1993 | Rogers et al. | 73/40.7 |
| 5,323,640 | | 6/1994 | Pocaro et al. . | |
| 5,369,984 | * | 12/1994 | Rogers et al. | 73/49.2 |
| 5,425,266 | * | 6/1995 | Fournier | 73/49.7 |
| 5,454,258 | * | 10/1995 | Capuano | 73/61.43 |
| 5,644,072 | * | 7/1997 | Chirco et al. | 73/49.2 |
| 5,668,308 | * | 9/1997 | Denby | 73/49.2 |
| 5,756,882 | * | 5/1998 | Cranfill et al. | 73/46 |
| 5,763,764 | * | 6/1998 | Mieczkowski et al. | 73/40 |
| 5,886,266 | * | 3/1999 | Stiller et al. | 73/756 |
| 5,898,108 | * | 4/1999 | Miecxkowski et al. | 73/118.1 |
| 5,952,559 | * | 9/1999 | Harris et al. | 73/49.7 |
| 5,996,402 | * | 12/1999 | Harris | 73/49.7 |
| 6,052,057 | * | 4/2000 | Yang et al. | 340/605 |

FOREIGN PATENT DOCUMENTS

| | | |
|---|---|---|
| 2 635 823 | 8/1988 | (FR) . |
| 04-131729A | 5/1992 | (JP) . |

* cited by examiner

*Primary Examiner*—Hezron Williams
*Assistant Examiner*—Charles D. Garber
(74) *Attorney, Agent, or Firm*—Barnes & Thornburg

(57) ABSTRACT

A fuel system leakage detector (1) includes a pressure source (3) and a test head (4) adapted to be coupled to a fuel system (17) of a vehicle (19) with engine (21), fuel tank (18), fuel filler neck (20), fuel closure cap (16) and evaporative emissions cannister (24), such fuel systems leakage detector also having a pneumatic circuit (5) coupled to a pressure source (3) and the test head (4), a pneumatic circuit bypass (2) coupled to the pressure source (3) and the test head (4), and a signaling device (7). The pneumatic circuit (5) includes a measurement device (6) coupled to the signaling device through which pressurized gas flows during leakage testing. Before testing, pressurized gas is diverted through the pneumatic circuit bypass (2) and bypasses the pneumatic circuit including the measurement device (6) to charge the test head (4) and the fuel system (17) for testing. The measurement device (6) then detects gas pressure differences between the test head (4) and the atmosphere whereby the signaling device (7) indicates the results of the leakage test.

13 Claims, 3 Drawing Sheets

FUEL SYSTEM LEAKAGE DETECTOR

BACKGROUND AND SUMMARY OF THE INVENTION

This application claims priority under 35 U.S.C. § 119 (e) to U.S. Provisional Application No. 60/081,670, filed Apr. 14, 1998, which is expressly incorporated by reference herein.

The present invention relates to a leakage detector, and particularly, to a leakage detector that tests the leakage integrity of components associated with vehicle fuel systems. More particularly, the present invention relates to a leakage detector having a pressure sensor that measures pressure during testing to determine whether the leakage test has been passed or failed.

Vehicle fuel systems include components such as a fuel tank, a filler neck through which the fuel tank is filled with fuel, a filler neck closure cap, a pressure-relief valve that vents fuel vapors from the fuel tank to a canister of the fuel system, and a vapor line that vents fuel vapors from the canister to the engine. The removable filler neck closure cap closes an open end of the filler neck. initally, vehicle fuel system components are designed and produced to seal properly so that, for environmental reasons, leakage of fuel vapors from the fuel system into the atmosphere is minimized.

According to the present invention, a fuel system leakage detector is provided including a pressure source providing pressurized gas, a test head adapted to be coupled to a fuel system component, a pneumatic circuit in fluid communication with the pressure source and the test head, and a pneumatic circuit bypass in fluid communication with the pressure source. The pneumatic circuit includes a measurement device and a conduit supplying pressurized gas from the pressure source to the test head. The measurement device is coupled to the conduit to detect a leakage characteristic of the fuel system component being tested. Pressurized gas is diverted into the pneumatic circuit bypass so that pressurized gas flows through the pneumatic circuit bypass and bypasses the pneumatic circuit.

According to a preferred embodiment of the present invention, the test head includes a filler neck connector adapted to couple to a filler neck of a fuel system and a cap connector adapted to couple to a closure cap of the fuel system. The measurement device includes a first indicator and a second indicator. The first indicator is in fluid communication with the filler neck connector of the test head through the conduit to detect leakage characteristics related to the fuel system being tested, The second indicator is in fluid communication with the cap connector portion of the test head through the conduit to detect leakage characteristics related to the closure cap being tested.

The fuel system leakage detector further comprises a valve. The valve is positioned to move between a first position and a second position. While in the first position, the valve blocks the flow of gas to the filler neck connector of the test head and permits the flow of gas to the cap connector of the test head during testing of the closure cap. While in the second position, the valve blocks the flow of gas to the cap connector of the test head and permits the flow of gas to the filler neck connector of the test head during testing of the remainder of the fuel system.

The pneumatic circuit further includes first and second pressure regulators. The first pressure regulator supplies gas at first pressure level to the test head. The second pressure regulator supplies gas to the test head at a second pressure level that is different than the first pressure level.

The measurement device includes a pressure bridge coupled to the pneumatic system and the signaling device. The pressure bridge includes a first passage in fluid communication with the pressure source through the pneumatic circuit, a master orifice positioned to lie in the first passage, a first control orifice positioned to lie in the first passage between the pressure source and the master orifice, a second passage in fluid communication with the test head through the pneumatic circuit, a second control orifice positioned to lie in the second passage, the sensor, and the signal generator. The sensor is coupled to the first passage at a first location between the first control orifice and the master orifice and to the second passage at a second location between the second control orifice and the test head to detect the difference in gas pressure levels extant in the first and second passage during leakage testing.

A method is provided to prepare a fuel system leakage for testing. The method includes the steps of providing a measurement device and a test head adapted to couple to a fuel system and in fluid communication with the measurement device, passing pressurized gas through the measurement device, and diverting a pressurized gas so that pressurized gas bypasses the measurement device to charge the fuel system being tested.

Additional features of the invention will become apparent to those skilled in the art upon consideration of the following detailed description of a preferred embodiment exemplifying the best mode of carrying out the invention as presently perceived.

BRIEF DESCRIPTION OF THE DRAWINGS

The description below particularly refers to the accompanying figure in which.

DETAILED DESCRPITION OF THE INVENTION

Figure 1:
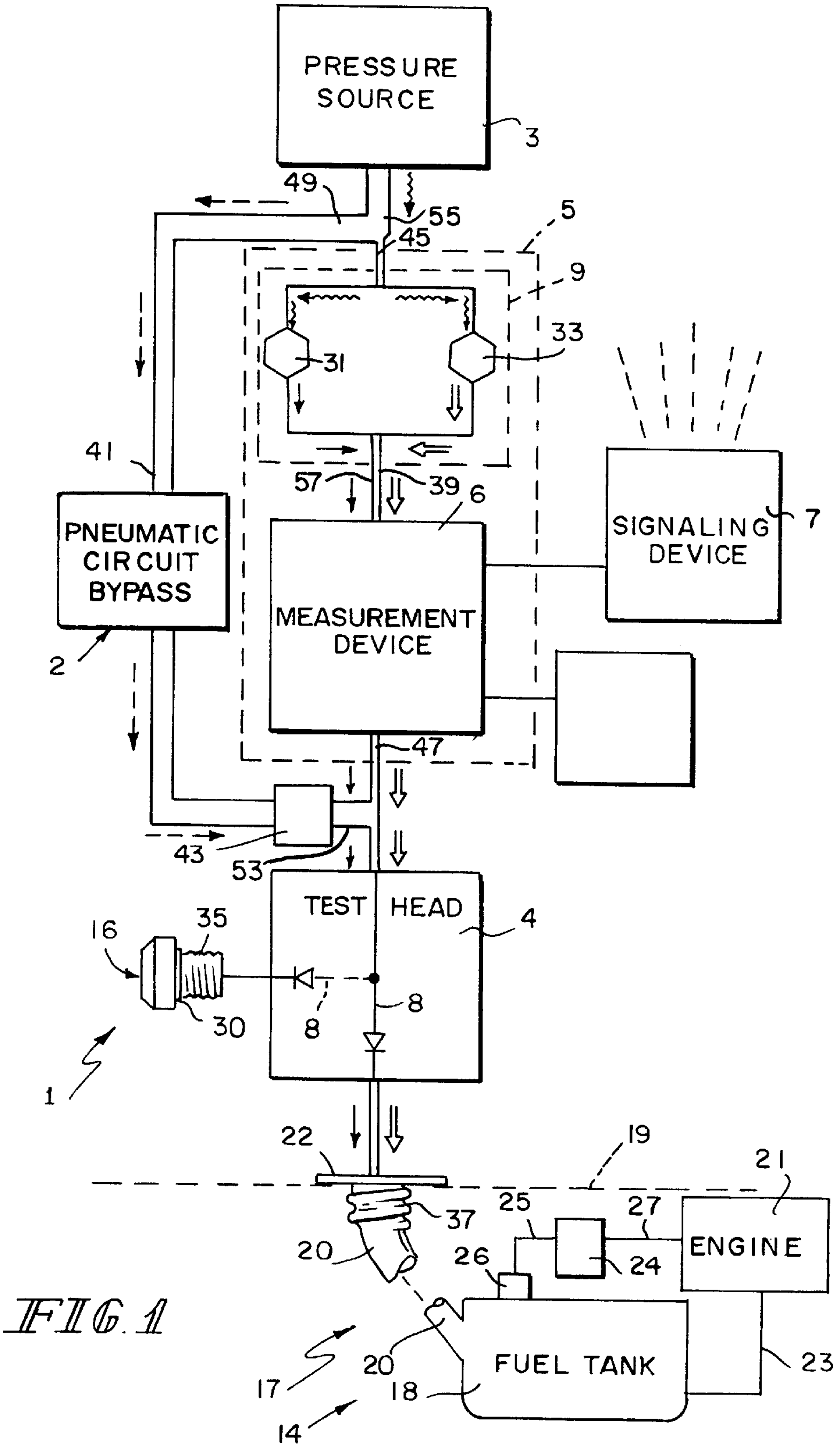
FIG. 1 is a diagrammatic view of a fuel system leakage detector in accordance with the present invention showing a pressure source at the top of the diagram, a vehicle fuel system including a fuel tank, a filler neck, and a filler neck closure cap at the bottom of the diagram, a test head arranged for installation into the filler neck, the filler neck closure cap arranged for installation on the test head, a pneumatic circuit providing gas from the pressure source to the test head, and including a measurement device detecting leakage characteristics of the fuel system a signaling device signaling leakage information derived from the leakage characteristics, and a pneumatic circuit bypass diverting gas (in phantom) around the measurement device to charge the fuel system for testing, the pneumatic circuit including a first flow path (solid arrow) through a first pressure regulator providing gas to the measurement device and the test head at a first pressure and second flow path (double arrow) through a second pressure regulator providing gas to the measurement device and the test head at a second pressure, and the fuel system leakage detector fuirther including a valve positioned to lie in the test head to move between a first position (solid arrow) providing gas to the filler neck and a second position (phantom arrow) providing gas to the filler neck closure cap.

A fuel system leakage detector 1 in accordance with the present invention is shown in FIG. 1. Leakage detector 1 is used to determine whether components of a fuel system 17 of a vehicle 19 seal properly to prevent fuel vapor from leaking out of fuel system 17 into the atmosphere or into a passenger compartment of vehicle 19.

Fuel system 17 of vehicle 19 includes a fuel tank 18, a filler neck 20 coupled to fuel tank 18, and a filler neck closure cap 16. Filler neck 20 includes an open end 22 which normally receives closure cap 16 and which receives a fuel-discharging pump nozzle (not shown) during refueling of fuel tank 18 after closure cap 16 has been removed from end 22 of filler neck 20.

Vehicle 19 includes an engine 21 and fuel system 17 includes a fuel line 23 through which fuel is routed from fuel tank 18 to engine 21. Fuel system 17 also includes other components such as, for example, a fuel vapor-recovery canister 24 and a tank pressure-relief valve 26. Pressure-relief valve 26 vents fuel vapor from fuel tank 18 to canister 24 through a vapor hose 25 when the pressure in fuel tank 18 exceeds a predetermined pressure. Fuel system 17 further includes a vapor line 27 that extends from canister 24 to engine 21.

Closure cap 16 includes an O-ring seal 30 that seals against open end 22 of filler neck 20 when closure cap 16 is installed therein. Closure cap 16 also includes a torque-override mechanism (not shown) that operates to prevent O-ring seal 30 from becoming damaged due to over tightening when closure cap 16 is installed in filler neck 20. In addition, closure cap 16 includes an internal pressure-relief valve (not shown) that operates to allow fuel vapor extant in filler neck 20 to vent through closure cap 16 to the atmosphere when the vapor pressure in filler neck 20 is above a predetermined pressure.

Under ideal circumstances, closure cap 16 and the remainder of fuel system 17 are leak-proof apparatus (within certain predetermined specifications). However, fuel system 17 may develop an unwanted leak that allows fuel vapor in excess of a predetermined amount to escape from fuel system 17 to the atmosphere. In addition, an unwanted leak may develop at O-ring seal 30 between filler neck 20 and closure cap 16 or in the pressure-relief valve of closure cap 16.

Fuel system leakage detector 1 is used to test the leakage integrity of closure cap 16 and the remainder of fuel system 17 to ensure that fuel vapor loss from fuel system 17 to the atmosphere is kept below a predetermined fuel vapor loss specification. Fuel system leakage detector includes a pressure source 3, a test head 4 that couples to closure cap 16 and filler neck 20 of fuel system 17 during leakage testing, a pneumatic circuit 5 that communicates pressurized gas from pressure source 3 to test head 4 during testing, a pneumatic circuit bypass 2, and a signaling device 7. Pneumatic circuit 5 includes a conduit 39 and a measurement device 6 coupled to conduit 39 and signaling device 7. Measurement device 6 detects the leakage characteristics of the fuel system components and generates a signal indicative of the leakage characteristics that is then sent to signaling device 7. Signaling device 7 then communicates leakage information derived from the signal sent by measurement device 6 to indicate if the fuel system component 10 passed the leakage test.

During leakage testing, pressurized gas is routed through pneumatic circuit 5 to test head 4 to provide pressurized gas to fuel system 17. Conduit 39 includes an inlet channel 45 coupled to pressure source 3 that recovers pressurized gas and an outlet channel 47 coupled to test head 4 that delivers pressurized gas thereto. The pressurized gas flows through fuel system 17 and leaks through any leaky fuel system components, if any. The leakage characteristics are then detected by measurement device 6 and communicated to a user by signaling device 7.

Pneumatic circuit bypass 2 diverts pressurized gas around pneumatic circuit 5. Pneumatic circuit bypass 2 includes an inlet end 49 coupled to inlet channel 45 of conduit 39 that receives pressurized gas from pressure source 3 and an outlet end 53 coupled to outlet channel 47 of conduit 39 that provides the diverted gas to test head 4. By diverting gas around pneumatic circuit 5, test head 4 and the fuel system component(s) being tested can be quickly charged for leakage test measuring by measurement device 6. Pneumatic circuit bypass 2 includes a bypass conduit 41 and a bypass valve 43 that is closed after charging test head 4 and fuel system 17.

Test head 4 includes a diverter valve 8, that can be moved between a cap-testing first position (phantom arrow) and a system-testing second position (solid arrow) to enable a leakage test to be performed either on closure cap 16 or the remainder of fuel system 17. When diverter valve 8 is adjusted to the first position, gas is permitted to flow to closure cap 16 and blocked from flowing to the remainder of fuel system 17. When diverter valve 8 is adjusted to the second position, gas is blocked from flowing to closure cap 16 and permitted to flow to the remainder of fuel system 17.

Pneumatic circuit 5 further includes pressure controller 9 including a gas inlet 55 coupled to inlet end 49 of conduit 39, a gas outlet 57 coupled to measurement device 6, a first pressure regulator 31, and a second pressure regulator 33. First pressure regulator 31 provides gas to measurement device 6 at a first predetermined pressure during testing and second pressure regulator 33 provides gas to measurement device 6 at a second predetermined pressure that is greater than the first pressure to permit testing of fuel system 17 at different pressure conditions.

Figure 2:
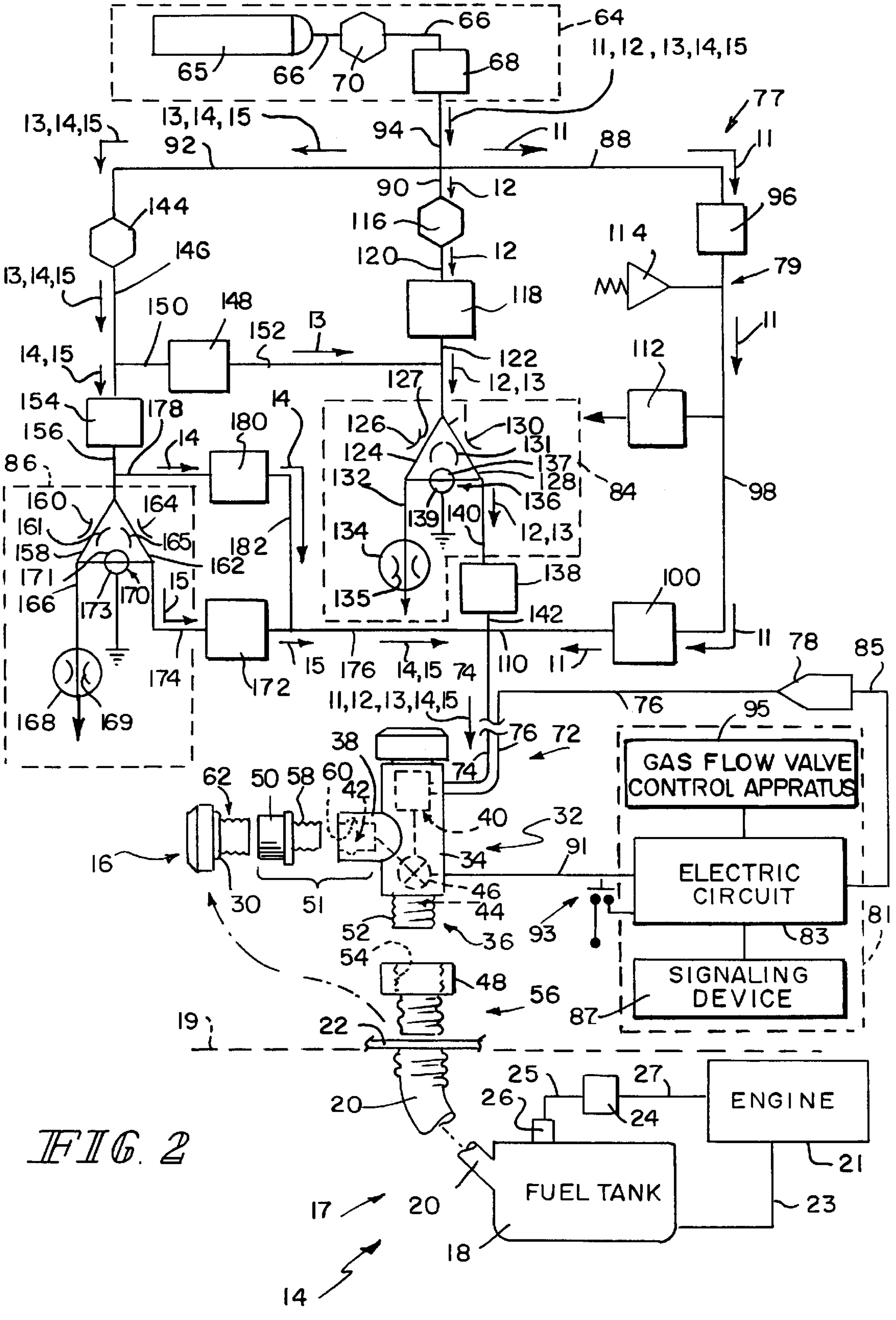
FIG. 2 is a diagrammatic view of a preferred embodiment fuel system leakage detector in accordance showing a pressurized gas source at the top of the diagram, the vehicle fuel system at the bottom of the diagram, a T-shaped test head and a filler neck adapter arranged for installation into the filler neck, five pressurized gas flow paths between the gas source and the test head, a pressure-sensing line coupling the test head to an analog pressure switch, the vehicle filler neck closure cap and a cap adapter to the left of the test head, and each gas flow path including one or more of a pressure regulator, a gas flow valve, or a pressure-measurement bridge.

According to a preferred embodiment of the present invention, a fuel system leakage detector 10 includes a T-shaped test head 32 that couples to open end 22 of filler neck 20 during a leakage test and receives closure cap 16 as shown in FIG. 2. Test head 32 includes a body 34, a threaded filler neck connector 36 coupled to body 34, and a closure cap connector 38 coupled to body 34 as shown in FIG. 2. Body 34 includes a main chamber 40; closure cap connector 38 includes an auxiliary chamber 42; and filler neck connector 36 includes a passage 44.

Test head 32 includes a diverter valve 46, shown diagrammatically in FIG. 2, that can be moved between a cap-testing first position and a system-testing second position to enable a leakage test to be performed either on closure cap 16 or the remainder of fuel system 17. When diverter valve 46 is adjusted to lie in the first position, passage 44 is isolated from main chamber 40 and auxiliary chamber 42 is in fluid communication with main chamber 40 so that a leakage test can be performed on closure cap 16. When diverter valve 46 is adjusted to lie in the second position, auxiliary chamber 42 is isolated from main chamber 40 and passage 44 is in fluid communication with main chamber 40 so that a leakage test can be performed on the remainder of fuel system 17.

Fuel system leakage detector 10 includes a filler neck adapter 48 and a cap adapter 50 as shown in FIG. 2. Filler neck connector 36 of test head 32 is formed to include an external thread 52 and filler neck adapter 48 is formed to include an internal threaded connector 54 that mates with external thread 52. Filler neck adapter 48 also includes external connector 56 that is configured to mate with the particular style of connector on filler neck 20 included in vehicle 14. For example, connector 56 may be external threads, quick-on cams, flanges, or other structure well-known to those skilled in the art. For certain types of vehicles, open end 22 of filler neck 20 may be configured in such a way that filler neck connector 36 of test head 32 can couple directly to filler neck 20 without the use of filler neck adapter 48.

Cap adapter 50 is formed to include an external threaded connector 58 and closure cap connector 38 is formed to include an internal threaded connector 60 that mates with external threaded connector 58. Cap 16 includes external connector 62 that is configured to mate with the particular style of filler neck 20 when installed therein. For example, connector 62 may be external threads, quick-on cams, flanges or other structure well-known to those skilled in the art. For certain types of closure caps, closure cap connector 38 may be configured in such a way that connector 62 of closure cap 16 can couple directly to closure cap connector 38 without the use of cap adapter 50.

Thus, leakage detector 10 includes a cap-support fixture 51 which, in some instances, includes cap adapter 50 and closure cap connector 38 and, in other instances, includes only closure cap connector 38. Descriptions of cap adapters and detectors and an explanation of how cap adapters are used with cap leakage detectors are provided in U.S. Patent Application No. 08/974,857, filed on Nov. 20, 1997, which application is hereby incorporated by reference herein. When cap 16 is mounted to cap-support fixture 51, diverter valve 46 is moved automatically by valve-adjustment apparatus (not shown) included in test head 32 to the second position so that leakage detector 10 can be operated to perform a cap leakage test.

Fuel system leakage detector 10 includes a pressurized gas source 64 as shown in FIG. 2. Gas source 64 includes a gas tank 65, which in preferred embodiments is a tank of Nitrogen gas, although any inert gas could be used. Gas source 64 further includes a supply line 66 extending from gas tank 65 to a master gas flow valve 68 through a master pressure regulator 70 which, in preferred embodiments, is rated at ten pounds per square inch (10 psi)(68.95 kPa). Gas flow valve 68 is operable to open and close using solenoids or any suitable remote control valve actuator.

Leakage detector 10 includes a pneumatic circuit 77 that couples gas source 64 to test head 32 as shown, for example, in FIG. 2. Pneumatic circuit 77 couples to an output line 94 of gas source 64 extending from gas flow valve 68 of gas source 64. Pneumatic circuit 77 includes a pneumatic coaxial hose 72 having a first line 74 and a second line 76, each of which extends from test head 32 and each of which is coupled fluidly to main chamber 40 formed in body 34 of test head 32. Pneumatic circuit 77 further includes a first gas flow path (indicated by arrows 12), a second gas flow path (indicated by arrows 13), a third gas flow path (indicated by arrows 14), and a fourth gas flow path (indicated by arrows 15). Each gas flow path 12, 13, 14, 15 couples output line 94 to first line 74 of pneumatic hose 72. Second line 76 of pneumatic hose 72 is coupled to an analogy pressure switch 78. The end of second line 76 that is coupled to pressure switch 78 is closed so that no gas flows through second line 76. Thus, second line 76 is a pressure-sensing line 76 for use in sensing pressure in chamber 40 during various phases of the cap and fuel system leakage tests.

Leakage detector 10 further includes a pneumatic circuit bypass 79 coupled to output line 94. Pneumatic circuit bypass 79 also includes first line 74 of pneumatic hose 72 to provide a bypass path (indicated by arrows 11) around pneumatic circuit 77 from gas source 64 to test head 32.

At least one gas flow valve (represented by squares in FIG. 2) is included in each gas flow path 11, 12, 13, 14, 15. Each of the gas flow valves is operable to open and close using solenoids or any suitable remote control valve actuator. According to the preferred embodiment of the present invention, the valves are open/closed solenoid valves.

Leakage detector 10 further includes a control network 81 including an electric circuit 83, a gas flow valve control apparatus 95, and a signaling device 87. Electric circuit 83 receives input signals on electric signal line 85 extending from pressure switch 78 to indicate that predetermined pressure levels associated with pressure switch 78 have been reached in main chamber 40. Electric circuit 83 also receives an input signal on an electric signal line 91 extending from test head 32 to indicate whether a cap leakage test or fuel system leakage test is to be performed. Leakage detector 10 also includes an actuation button 93 that is coupled to electric circuit 83 and that is actuated by an operator when a leakage test is to be performed.

Electric circuit 83 is coupled electrically to each gas flow valve 68, 96, 100, 112, 118, 138,148, 154,172, 180 by gas flow valve signal apparatus 95 as shown diagrammatically in FIG. 2. Each gas flow valve is normally in a closed position blocking the flow of gas therethrough. Based on the input signals received on signal lines 85, 91 and received from actuation button 93, electric circuit 83 sends output signals through signal apparatus 95 to appropriate gas flow valves to move the appropriate gas flow valves to opened positions from the respective closed positions thereby allowing gas to flow therethrough.

Output line 94 and first line 74 are included in each gas flow path 11, 12, 13, 14, 15 as shown in FIG. 2. Gas flow path 11 includes a line 88 extending from line 94 and coupling to a first tank-charge gas flow valve 96 which is included in bypass path 11 as well. Bypass path 11 further includes a line 98 that couples first tank-charge gas flow valve 94 to a second tank-charge gas flow valve 100 also included in bypass path 11. Bypass path 11 includes a line 110 that couples gas flow valve 100 to first line 74. A solenoid-controlled vent valve 112 and a mechanical pressure-relief valve 114 are each coupled to line 98 between gas flow valves 96, 100.

Vent valve 112 is normally in a closed position and is signaled by electric circuit 83 through gas flow valve signal apparatus 95 to move to an opened position when pressure switch 78 sends a signal to electric circuit 83 when the pressure. in chamber 40 reaching a first predetermined pressure level, which, in preferred embodiments, is forty-five inches of water (11.2 kPa). When pressure switch 78 sends said signal, electric circuit 83 sends signals through apparatus 95 to close all of the gas flow valves except valves 100, 112 so that pressurized gas vents from chamber 40 through valves 100, 112 to the atmosphere. Pressure-relief valve 114 is normally in a closed position and opens at fifty inches of water (12.5 kPa). Pressure-relief valve 114 is provided as a back-up in case, for some reason, vent valve 112 does not open at forty-five inches of water (11.2 kPa).

Gas flow path 12 of pneumatic circuit 77 includes a line 90 extending from line 94 and coupling to a low pressure regulator 116 which is included in gas flow path 12 as well. Gas flow path 12 includes a line 120 that couples pressure regulator 116 to a first inlet gas flow valve 118 of gas flow path 12 as shown in FIG. 2. A line 122 is included in gas flow paths 12, 13 and couples first inlet gas flow valve 118 to a pressure bridge 84, which is also included pneumatic circuit 77 and gas flow paths 12, 13. Gas flow paths 12, 13 firther include a line 142 that couples bridge 84 to a first outlet gas flow valve 138 included in gas flow paths 12, 13. In addition, gas flow paths 12, 13 include a line 142 that couples gas flow valve 138 to first line 74 of pneumatic hose 72.

Bridge 84 measures a pressure that corresponds to the leakage rate of fuel system 17 when pressurized gas from gas source 64 flows through bridge 84. Bridge 84 includes a first passage 124 with a first control orifice 126 and a second passage 128 with a second control orifice 130. First control orifice 126 has an inner perimeter 127 defining a first predetermined flow area providing a first predetermined flow resistance. Second control orifice 130 has an inner perimeter 131 defining a second predetermined flow area that is substantially the same as the first predetermined flow area providing a second predetermined flow resistance that is substantially the same as the first predetermined flow resistance. According to an alternative embodiment, the predetermined flow areas and resistances of the control orifices are different.

Passages 124, 128 are each in fluid communication with line 122. Bridge 84 further includes an outlet passage 132 with a master orifice 134. Master orifice 134 has an inner perimeter 135 defining a predetermined flow area providing a predetermined flow resistance. Outlet passage 132 is in fluid communication with first passage 124. Outlet passage 132 is also in fluid communication with the atmosphere. Second passage 128 of bridge 84 is coupled to gas flow valve 138 via line 140.

Bridge 84 includes a pressure indicator 136 which is coupled fluidly to first and second passages 124, 128 as shown in FIG. 2. In preferred embodiments, pressure indicator 136 is a differential-pressure transducer that includes a sensor 137 that detects pressure differences between first and second passages 124, 128 on the outlet side of respective control orifices 126, 130 and a signal generator 139 that provides a fuel system leakage signal to electric circuit 83 derived from the difference in pressure in first and second passages 124, 128. Electric circuit 83 is configured to determine whether fuel system 17 passes or fails the leakage test based on the signal provided by pressure indicator 136 and activate signaling device 87 to communicate information derived from the signal sent by signal generator 139. Electric circuit 83 and bridge 84 operate in a manner substantially similar to the device described in detail in PCT patent application Ser. No. PCT/US/13415 which was published on Mar. 6, 1997 as Publication No. WO97/08528 and which is hereby incorporated herein by reference.

Gas flow paths 13, 14, 15 of pneumatic circuit 77 include a line 92 extending from line 94 and coupling to a high-pressure regulator 144 included in gas flow paths 13, 14, 15 as well. Gas flow paths 13, 14, 15 include a line 146 extending from high-pressure regulator 144 as shown in FIG. 2. Gas flow path 13 splits off of line 146 and couples to a second inlet gas flow valve 148 of gas flow path 13 via a line 150 which is included in gas flow path 13 as well. Gas flow path 13 further includes a line 152 that couples gas flow valve 148 to line 122. Gas flow path 13 then proceeds through bridge 84 along with gas flow path 12 as previously described.

Gas flow paths 14, 15 proceed in line 146 to couple to a third inlet gas flow valve 154 included in gas flow paths 14, 15. Gas flow paths 14, 15 also include a line 156 extending from gas flow valve 154. Gas flow path 15 includes a second pneumatic bridge 86 coupled to line 156 and gas flow path 14 splits from gas flow path 15 prior to bridge 86. Gas flow path 15 firther includes a line 174 that couples bridge 86 to a second outlet gas flow valve 172 included in gas flow path 15. Bypass path 14 includes a line 178 that splits off of line 156 and couples to a cap-charge gas flow valve 180 which is also included in gas flow path 14. Bypass path 14 further includes a line 182 extending from gas flow valve 180. Gas flow paths 14, 15 include a line 176 that couples to line 180 of gas flow path 14 and that couples to gas flow valve 172 of gas flow path 15. Line 176 couples to first line 74 of pneumatic hose 72.

Bridge 86 measures a pressure that corresponds to the leakage rate of closure cap 16 when pressurized gas from gas source 64 flows through bridge 86. Bridge 86 includes a first passage 158 with a first control orifice 160 and a second passage 162 with a second control orifice 164 as shown in FIG. 2. First control orifice 160 has an inner perimeter 161 defining a first predetermined flow area providing a first predetermined flow resistance. Second control orifice 164 has an inner perimeter 165 defining a second predetermined flow area that is substantially the same as the first predetermined flow area providing a second predetermined flow resistance that is substantially the same as the first predetermined flow resistance. According to an alternative embodiment, the predetermined flow areas and resistances of the control orifices are different.

Passages 158, 162 are each in fluid communication with line 156. Bridge 86 further includes an outlet passage 166 with a master orifice 168. Master orifice 168 has an inner perimeter 169 defining a predetermined flow area providing a predetermined flow resistance. Inner perimeter 169 of master orifice 168 is a different size than inner perimeter 135 of master orifice 134 to provide different predetermined flow areas and resistances corresponding to different acceptable leakage rates for closure cap 16 and the remainder of fuel system 17. Outlet passage 166 is in fluid communication with first passage 158. Outlet passage 166 is also in fluid communication with the atmosphere. Second passage 162 of bridge 86 is coupled to gas flow valve 172 via line 140. Gas flow valve 172 is coupled to first line 74 of pneumatic hose 72 via a line 176.

Bridge 86 includes a pressure indicator 170 which is coupled fluidly to first and second passages 158, 162 as shown in FIG. 2. In preferred embodiments, pressure indicator 170 is a differential-pressure transducer that includes a sensor 171 that detects pressure difference between first and second passage 158, 162 on the outlet side of respective control orifices 160, 164 and a signal generator 173 that provides a fuel system leakage signal to electric circuit 83 derived from the difference in pressure in the first and second passages 158, 162. Electric circuit 83 is configured to determine whether closure cap 16 passes or fails the leakage test based on the signal provided by pressure indicator 170 and activates signaling device 87 to communicate information to the user derived from the signal sent by signal generator 173. Electric circuit 83 and bridge 86 cooperate in a manner substantially similar to the manner in which electric circuit 83 and bridge 84 cooperate to couple signaling device 87 to bridges 84, 86.

Thus, bridges 84, 86 cooperate to provide a measurement device that senses leakage characteristics of closure cap 16 and the remainder of fuel system 17. The measurement device then sends a signal to control network 81 that activates signaling device 87 to inform a user of the leakage test results.

In use, an operator either (1) installs the appropriate filler neck adapter 48 on filler neck connector 36 of test head 32 and then installs filler neck adapter 48 in open end 22 of filler neck 20 or (2) installs filler neck connector 36 of test head 32 to filler neck 20 directly, thereby coupling test head 32 to filler neck 20. Next, the operator installs the closure cap 16 in cap-support fixture 51, thereby coupling closure cap 16 to test head 32. The operator also clamps line 25 extending between valve 26 and canister 24 with a suitable device such as a pair of vice grips (not shown) so that, during the leakage test, pressurized gas is prevented from leaking into canister 24 and then into engine 21.

In preferred embodiments, electric circuit 83 includes a microprocessor (not shown) and associated components (not shown) such as one or more of a ROM chip, a RAM chip, a clock or oscillator, an analog-to-digital converter, and signal-conditioning circuitry. Signaling device 87 includes various indicators (not shown) such as, for example, PASS and FAIL LED's. According to alternative embodiments, other indicators such as LED screens, monitors, light bulbs, speakers, or dial gauge faces, are used for the signaling device. After line 25 is clamped and after test head 32 and closure cap 16 are coupled properly to filler neck 20 and cap-support fixture 51, respectively, the operator actuates button 93 so that software in the memory of electric circuit 83 is executed.

Before a leakage test is performed, all gas flow valves 68, 96, 100, 112, 118, 138, 148, 154, 172, 180 are in the respective closed positions. When the operator actuates the button 93, electric circuit 83 sends an output signal through apparatus 95 to open master gas flow valve 68. After gas flow valve 68 is opened and assuming that closure cap 16 is coupled to test head 32>electric circuit 83 sends output signals through apparatus 95 to open third inlet gas flow valve 154 and cap-charge gas flow valve 180. Master pressure regulator 70 is configured to provide a constant pressure of ten psi (68.95 kPa) in line 66 and high-pressure regulator 144 is configured to provide a constant pressure of thirty inches of water (7.47 kPa) in line 146. Each pressure regulator 70, 144 is a commercially available pressure regulator that provides a respective constant pressure level independent of the rate of flow of gas therethrough.

After gas flow valves 68, 154, 180 are opened, pressurized gas from gas source 64 flows through bypass path 14 into chamber 40 of test head 32 to charge test head 32 and closure cap 16. Pressurized gas also flows into auxiliary chamber 42 because diverter valve 46 is in the second position fluidly coupling chamber 40 with chamber 42 due to cap 16 being coupled to cap-support fixture 51. As pressurized gas flows into chambers 40, 42, the pressure in each of chambers 40, 42 increases and this pressure increase is communicated to pressure switch 78 via pressure-sensing line 76.

When the pressure in chambers 40, 42 reaches twenty-nine inches of water (7.22 kPa), pressure switch 78 sends an input signal on signal line 85 to electric circuit 83. The input signal from pressure switch 78 causes electric circuit 83 to send an output signal through apparatus 95 to close gas flow valve 180. After gas flow valve 180 closes, electric circuit 83 sends an output signal through apparatus 95 to open gas flow valve 172. According to an alternative embodiment, line 178, cap-change flow valve 180, and line 182 are not provided and test head 32 and closure cap 16 are charged through bypass path 14 or bypass path 11. According to another alternative embodiment, complementary valves are combined into a single valve. For example, gas flow valves 172, 180 are replaced by a single valve (not shown) that switches between opening and closing flow paths 14 and 15.

While gas flow valves 68, 154, 180 are opened allowing chambers 40, 42 to charge with pressurized gas, some pressurized gas is able to reach bridge 86 and leak to the atmosphere through passages 158, 166 and orifices 160, 168. However, it should be understood that orifices 160, 168 are small in size compared to the size of, for example, lines 156, 178, 182 and the size of a passage (not shown) of gas flow valve 180 so that the amount of pressurized gas that leaks to the atmosphere through orifices 160, 168 is a relatively small amount compared to the amount of pressurized gas that flows to chambers 40, 42. Thus, chambers 40, 42 are able to charge to twenty-nine inches of water (7.22 kPa) in a short amount of time even though some pressurized gas leaks to the atmosphere through bridge 86.

After gas flow valve 180 closes and gas flow valve 172 opens due to chambers 40, 42 being charged to the predetermined pressure, pressurized gas no longer flows through bypass path 14 but, instead, flows through gas flow path 15 which includes bridge 86 having passages 158, 162. The gas flowing through passage 158 also flows through orifice 160 and then flows through outlet passage 166 and master orifice 168 to the atmosphere. The gas flowing through passage 162 also flows through orifice 164 and then through, in sequence, line 174, gas flow valve 172, lines 176, 74, and chambers 40, 42, where the pressurized gas ultimately leaks through closure cap 16 to the atmosphere because production closure caps typically have leakage rates of about two cubic centimeters per minute to about ten cubic centimeters per minute. Thus, during the cap leakage test, gas source 64 causes pressurized gas to flow through orifice 160 and master orifice 168 to atmosphere and gas source 64 also causes pressurized gas to flow through orifice 164 and any leaks in closure cap 16 to atmosphere.

Master orifice 168 is configured to allow pressurized gas to pass therethrough at the maximum acceptable leakage rate for closure cap 16. Orifices 160, 164 and passages 158, 162 are similarly sized so that if the leakage rate of closure cap 16 is substantially equivalent to the leakage rate of master orifice 168, a substantially equivalent amount of pressurized gas will pass through orifices 160, 164 and passages 158, 162. If the leakage rate of closure cap 16 is substantially equivalent to the leakage rate of master orifice 168, pressure sensor 171 will sense that the pressures in passages 158, 162 are substantially equivalent. If the leakage rate of closure cap 16 is below the leakage rate of master orifice 168, pressure sensor 171 will sense that the pressure in passage 162 is greater than the pressure in passage 158 and closure cap 16 will “pass” the leakage test. If the leakage rate of closure cap 16 is above the leakage rate of master orifice 168, pressure sensor 171 will sense that the pressure in passage 162 is less than the pressure in passage 158 and closure cap 16 will “fail” the leakage test.

In preferred embodiments, the software of electric circuit 83 is written so that the pressure differential between passages 158, 162, which is indicated by pressure indicator 170 as an analog voltage signal, is sampled three seconds after gas flow valve 172 is opened. The analog voltage signal is converted to a digital equivalent which is compared to a threshold value stored in the memory of electric circuit 83. Based on the comparison, electric circuit 83 will send an output signal either to actuate signaling device 87 to indicate a PASS, if closure cap 16 passes the leakage test, or to indicate a FAIL, if closure cap 16 fails the leakage test. After the results of the cap leakage test have been indicated, electric circuit 83 sends output signals to close all gas flow valves 68, 96,100, 112, 118, 138, 148, 154, 172, 180. The operator is then prompted by signaling device 87 to remove closure cap 16 from cap-support fixture 51.

After the operator removes closure cap 16 and cap adapter 50 from receptacle 38 when the cap leakage test is finished, leakage detector 10 proceeds automatically to test the leakage rate of the remainder of fuel system 17. After the operator removes cap 16 and adapter 50 from receptacle 38, electric circuit 83 sends an output signal through apparatus 95 to open master gas flow valve 68. After gas flow valve 68 is opened, electric circuit 83 sends output signals to open first tank-charge gas flow valve 96 and second tank-charge gas flow valve 100. By opening gas flow valves 96, 100, pressurized gas from gas source 64 flows through gas flow path 11 into chamber 40 of test head 32. Pressurized gas also flows through passage 44 into filler neck 20 and fuel tank 18 because diverter valve 46 is in the first position fluidly coupling chamber 40 with passage 44 due to cap 16 and adapter 50 being decoupled from receptacle 38

Master pressure regulator 70 is configured to provide a constant pressure of ten psi (68.95 kPa) in line 66 independent of the rate of flow of gas therethrough as previously described. Flow regulator 70 is configured so that, chamber 40, passage 44, filler neck 20, and fuel tank 18 are charged rapidly with pressurized gas from gas source 64. As pressurized gas flows rapidly through bypass path 11 into each of chamber 40, passage 44, filler neck 20, and fuel tank 18, the pressure in chamber 40 increases and this pressure increase is communicated to pressure switch 78 via pressure-sensing line 76. When the pressure in chamber 40 reaches 14.5 inches of water (3.61 kPa), pressure switch 78 sends an input signal on signal line 85 to electric circuit 83.

For some types of vehicles, the input signal from pressure switch 78 causes electric circuit 83 to send output signals through apparatus 95 to close gas flow valve 96 and gas flow valve 100 simultaneously and then, after gas flow valves 96, 100 close, to send output signals through apparatus 95 to open first inlet gas flow valve 118 and first outlet gas flow valve 138. Opening gas flow valves 118, 138 allows pressurized gas to reach bridge 84 through gas flow path 12. The pressure in gas flow path 12 is regulated by pressure regulator 116, which, in preferred embodiments, is configured to provide a constant pressure of fifteen inches of water (3.74 kPa) in line 120 independent of the flow rate of gas therethrough.

For other types of vehicles, gas flow valves 96 and 100 remain open after pressure switch 78 sends the signal so that the pressure in chamber 40 continues to rise. When the pressure in chamber 40 reaches twenty-nine inches of water (7.22 kPa), pressure switch 78 sends an input signal on signal line 85 to electric circuit 83. For these other types of vehicles, the input signal from pressure switch 78 causes electric circuit 83 to send output signals through apparatus 95 to close gas flow valve 96 and gas flow valve 100 simultaneously and then, after gas flow valves 96, 100 close, to send output signals to open second inlet gas flow valve 148 and first outlet gas flow valve 138. Valves 118, 148 remain closed during charging to prevent gas from flowing through bridge 84. According to an alternative embodiment, either of said valves is open or non-existent so that gas may flow through bridge 84 during charging.

Opening gas flow valves 148, 138 allows pressurized gas to reach bridge 84 through gas flow path 13. The pressure in gas flow path 13 is regulated by pressure regulator 144, which, in preferred embodiments, is configured to provide a constant pressure of thirty inches of water (7.47 kPa) in line 146 independent of the flow rate of gas therethrough. Thus, depending upon the type of vehicle, pressurized gas reaches bridge 84 through line 122 at either a pressure of about fifteen inches of water (3.74 kPa), if the pressure in line 122 is regulated by pressure regulator 116, or a pressure of about thirty inches of water (7.47 kPa), if the pressure in line 122 is regulated by pressure regulator 144.

After gas flow valves 96, 100 close and after either gas flow valves 118, 138 or gas flow valves 148, 138 open due to chamber 40, filler neck 20, and fuel tank 18 being charged to the predetermined pressure as determined by pressure switch 78, pressurized gas no longer flows through bypass path 11 but, instead, flows along either path 12, 13 from line 122 into passages 124, 128 of bridge 84. The gas flowing through passage 124 also flows through orifice 126 and then flows through outlet passage 132 and master orifice 134 to the atmosphere. The gas flowing through passage 128 also flows through orifice 130 and then through, in sequence, line 140, gas flow valve 138, lines 142, 74, chamber 40, passage 44, filler neck 20, and fuel tank 18 where the pressurized gas ultimately leaks to the atmosphere through any leaks that exist in filler neck 20 and fuel tank 18. Thus, during the fuel system leakage test, gas source 64 causes pressurized gas to flow through orifice 126 and master orifice 134 to the atmosphere and gas source 64 also causes pressurized gas to flow through orifice 130 and any leaks in filler neck 20 and fuel tank 18 to the atmosphere.

Master orifice 134 is configured to allow pressurized gas to pass therethrough at the maximum acceptable leakage rate for fuel tank 18 and filler neck 20. Orifices 126, 130 and passages 124, 128 are similarly sized so that if the leakage rate of fuel tank 18 and filler neck 20 is substantially equivalent to the leakage rate of master orifice 134, a substantially equivalent amount of pressurized gas will pass through orifices 126, 130 and passages 124, 128. If the leakage rate of fuel tank 18 and filler neck 20 is substantially equivalent to the leakage rate of master orifice 134, pressure sensor 137 will sense that the pressures in passages 124, 128 are substantially equivalent. If the leakage rate of fuel tank 18 and filler neck 20 is below the leakage rate of master orifice 134, pressure sensor 137 will sense that the pressure in passage 128 is greater than the pressure in passage 124 and fuel tank 18 and filler neck 20 will pass the leakage test. If the leakage rate of fuel tank 18 and filler neck 20 is above the leakage rate of master orifice 134, pressure sensor 137 will sense that the pressure in passage 128 is less than the pressure in passage 124 and fuel tank 18 and filler neck 20 will fail the leakage test.

In preferred embodiments, the software of electric circuit 83 is written so that the pressure differential between passages 124, 128, which is indicated by pressure indicator 136 as an analog voltage signal, is sampled five seconds after gas flow valve 138 is opened. The analog voltage signal is converted to a digital equivalent which is compared to a threshold value stored in the memory of electric circuit 83. Based on the comparison, electric circuit 83 sends an output signal either to actuate signaling device 87 to indicate a PASS, if fuel tank 18 and filler neck 20 pass the leakage test, or to indicate a FAIL, if fuel tank 18 and filler neck 20 fail the leakage test. The software is also programmed store these results for and to test the functionality of each valve and notify the user of a malfunction.

According to an alternative embodiment, the software is programmed to test fuel system 17 at a "low" and "high" pressure. A particular type of vehicle has a pressure-relief valve 26 or other valve(s) (not shown) that open above the low pressure. Thus, during the low pressure test, only filler neck 20 and fuel tank 18 are are tested. During the high pressure test, pressure-relief valve 26 opens so that filler neck 20, fuel tank 18, pressure-relief valve 26, vapor line 25, canister 24, and vapor line 27 are tested.

During the low pressure test, fuel system 17 is charged through bypass path 11. An input signal from pressure switch 78 causes electric circuit 83 to send output signals through apparatus 95 to close gas flow valve 96 and gas flow valve 100 simultaneously and then, after gas flow valves 96, 100 close, to send output signals through apparatus 95 to open first inlet gas flow valve 118 and first outlet gas flow valve 138. Opening gas flow valves 118, 138 allows pressurized gas to reach bridge 84 through gas flow path 12 for low pressure leakage testing. Electric circuit 83 is programmed to store the results of this low pressure test.

Fuel system 17 is then charged to a higher pressure level through bypass path 11 for the high pressure test. Pressure switch 78 sends a signal to electric circuit 83 so gas flow valves 96 and 100 are opened and the pressure in chamber 40 continues to rise.

When the pressure in chamber 40 reaches twenty-nine inches of water (7.22 kPa), pressure switch 78 sends an input signal on signal line 85 to electric circuit 83. The input signal from pressure switch 78 causes electric circuit 83 to send output signals through apparatus 95 to close gas flow valve 96 and gas flow valve 100 simultaneously and then, after gas flow valves 96, 100 close, to send output signals to open second inlet gas flow valve 148 and first outlet gas flow valve 138. Opening gas flow valves 148, 138 allows pressurized gas to reach bridge 84 through gas flow path 13 for high pressure leakage testing. Electric circuit 83 is programmed to store the results of this high pressure test.

Electric circuit 83 is programmed to perform a boolean routine considering the results of the low and high pressure tests. If fuel system 17 failed the low pressure leakage test, electric circuit 83 will instruct signaling device 87 to indicate an AUTOMATIC FAIL. If fuel system 17 passed the low pressure leakage test and failed the high pressure leakage test, electric circuit 83 will instruct signaling device 87 to indicate a LOW PASS. If fuel system 17 passes both the low and high pressure leakage tests, electric circuit 83 will instruct signaling device 87 to indicate a HIGH PASS. If an AUTOMATIC FAIL is indicated, the user knows that an unacceptable leak exists in filler neck 20 or fuel tank 20. If a LOW PASS is indicated, the user knows that an unacceptable leak exists in pressure-relief valve 26, vapor line 25, canister 24, vapor line 27, or some combination thereof. If a HIGH PASS is indicated, the user knows that filler neck 20, fuel tank 18, pressure-relief-valve 26, vapor line 25, canister 24, and vapor line 27 all pass both the low and high leakage tests.

After the results of the leakage tests have been indicated, the operator is prompted by electric circuit 83 that the fuel system leakage test is finished. The operator then has the option of either concluding the fuel system leakage test or performing a "purge flow" test while vehicle engine 21 is running. If the operator decides to conclude the leakage test, the operator actuates a depressurization button (not shown) and electric circuit 83 sends output signals through apparatus 95 to, first, close all gas flow valves 68, 96,100, 112, 118, 138, 148, 154, 172, 180, and then, to open gas flow valves 100, 112.

Opening gas flow valves 100, 112 allows pressurized gas to flow from fuel tank 18, filler neck 20, and test head 32 through lines 74, 110, gas flow valve 100, line 98, and gas flow valve 112 to the atmosphere. After the pressure in fuel tank 18, filler neck 20 and test head 32 has discharged through gas flow valve 112 to the atmosphere, the operator decouples test head 32 and filler neck adapter 48 from filler neck 20, thereby concluding the fuel system leakage test. If the fuel system leakage test was performed at the pressure of thirty inches of water (7.47 kPa), as governed by pressure regulator 144, electric circuit 83 activates signaling device 87 to send a "decouple" signal to alert the user that the pressure in fuel tank 18, filler neck 20, and test head 32 has been reduced sufficiently to allow test head 32 to be decoupled from filler neck 20.

If the operator decides that a purge flow test is to be performed on fuel system 17 of vehicle 14, the operator first unclamps vapor hose 25 by, for example, removing the vice grips that were used to clamp hose 25 prior to the cap and fuel system leakage tests and starts vehicle engine 21. After unclamping vapor hose 25, the operator sends an input signal to electric circuit 83 by actuating a purge test button (not shown). After the purge test button is actuated, electric circuit 83 sends output signals through apparatus 95 to close the valves associated with gas flow paths 12–15 and to open gas flow valves 96, 100 so that test head 32, filler neck 20, and fuel tank 18 are pressurized with gas from gas source 64 through gas flow path 11.

When fuel tank 18, filler neck 20, and test head 32 are sufficiently pressurized, switch 78 sends an input signal on signal line 85 to electric circuit 83. After switch 78 closes during the purge test, electric circuit 83 sends output signals through apparatus 95 to close gas flow valves 96, 100 and to open gas flow valves 148, 138 so that pressurized gas from gas source 64 flows through gas flow path 13 to reach bridge 84 at a pressure of about thirty inches of water (7.47 kPa), as governed by pressure regulator 144. During the purge test, bridge 84 operates in a manner substantially similar to the manner in which bridge 84 operated during the fuel system leakage test described above.

When the pressure within fuel tank 18 reaches a particular level during the purge test, pressure-relief valve 26 will open to allow pressurized gas to flow from fuel tank 18 into canister 24. Flow of pressurized gas into canister 24 causes vapor line 27 leading from canister 24 to engine 21 to be pressurized. Pressure sensor 137 of bridge 84 will sense appropriate changes in pressure when pressure-relief valve 26 opens and electric circuit 83 will take the pressure readings at appropriate times to determine whether pressure-relief valve 26 operates properly and to determine if any unwanted leaks exist in canister 24, pressure-relief valve 26, or vapor lines 25, 27.

In preferred embodiments, the software of electric circuit 83 is written so that during the purge test the pressure differential between passages 124, 128, which is indicated by pressure indicator 136 as an analog voltage signal, is sampled five seconds after gas flow valve 138 is opened. The analog voltage signal is converted to a digital equivalent which is compared to a threshold value stored in the memory of electric circuit 83. Based on the comparison, electric circuit 83 sends an output signal either to actuate signaling device 87 to indicate a PASS, if filler neck 20, fuel tank 18, filler neck 20, pressure-relief valve 26, vapor line 25, canister 24, and vapor line 27 pass the purge test, or to indicate a FAIL, if filler neck 20, fuel tank 18, filler neck 20, pressure-relief valve 26, vapor line 25, canister 24, and vapor line 27 fail the purge test.

Thus, leakage detector 10 includes lines 94, 88, 98, 110, 74 and gas flow valves 96, 110 that provide first gas flow path 11 through which fuel system 17 is charged with pressurized gas from gas source 64 when gas flow valves 112, 118, 138, 148, 154, 172, 180 and mechanical pressure-relief valve 114 are closed. Leakage detector 10 includes pressure regulator 116; lines 94, 90, 120, 122, 140, 142, 74; gas flow valves 118, 138; and bridge 84 that provide second gas flow path 12 through which pressurized gas from gas source 64 flows at low pressure to test fuel system 17 for leaks when gas flow valves 96, 100, 112, 148, 154, 172, 180 are closed. Leakage detector 10 includes pressure regulator 144; lines 94, 92, 146, 150, 152, 122, 140, 142, 74; gas flow valves 148, 138; and bridge 84 that provide third gas flow path 13 through which pressurized gas flows at high pressure to test fuel system 17 for leaks when gas flow valves 96, 100, 112, 118, 154, 172, 180 are closed.

In addition, leakage detector 10 includes pressure regulator 144; lines 94, 92, 146, 156, 178, 182, 176, 74; and gas flow valves 154, 180 that provide fourth gas flow path 14 through which chambers 40, 42 are charged with pressurized gas from gas source 64 when gas flow valves 96, 100, 112, 118, 138, 148, 172 are closed and closure cap 16 is coupled to cap-support fixre 51. Finally, leakage detector 10 includes pressure regulator 144; lines 94, 92, 146, 156, 174, 176, 74; gas flow valves 154, 172; and bridge 86 that provide fifth gas flow path 15 through which pressurized gas flows to test closure cap 16 for leaks when valves 96, 100, 112, 118, 138, 148, 180 are closed and closure cap 16 is coupled to cap-support fixture 51.

It should be understood that, with reference to the above description, the terms "conduit(s)", "line(s)", "hose(s)", "passage(s)", and "tube(s)" are used to indicate some type of structure having an interior region that allows gas to flow therethrough. Thus, in an actual device embodying the invention as presently perceived, any of the referred-to conduits, lines, tubes, hoses, and passages could be hoses, tubes, conduits, manifolds, holes through pieces of material, passages formed in pieces of material, lines, or the equivalents of these. In addition, it should be understood that an actual leakage detector 10 made in accordance with the present invention will include some type of housing that contains the components of leakage detector 10 with the exception of gas tank 65, which would be separately provided and coupled to line 66 via a connector, and with the exception of test head 32 which would be coupled by hose 72 to the remainder of leakage detector 10 in spaced apart relation therewith.

Figure 3:
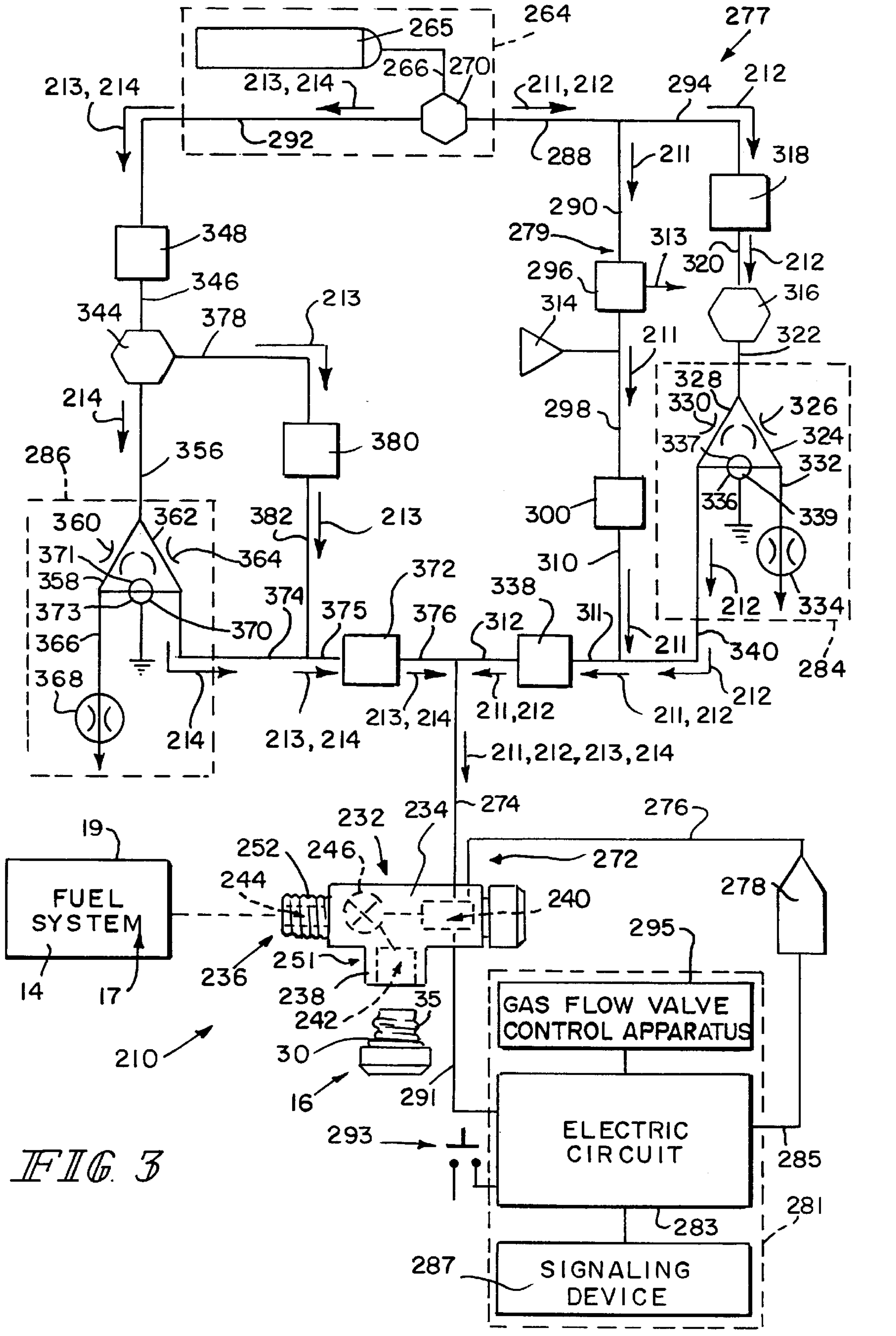
FIG. 3 is a diagrammatic view of an alternative embodiment filel system leakage detector similar to the leakage detector of FIG. 2 but having one less gas flow path and having fewer gas flow valves.

An alternative embodiment fuel system leakage detector 210, shown in FIG. 3, may also be used to test the leakage integrity of fuel system 17 and closure cap 16. Leakage detector 210 includes a test head 232 that couples to open end 22 of filler neck 20 when closure cap 16 is removed from filler neck 20 during a leakage test. Test head 232 includes a body 234, a threaded filler neck connector 236 coupled to body 234, and an auxiliary closure cap connector 238 coupled to body 234 as shown in FIG. 3. Body 234 includes a main chamber 240, closure cap connector 238 includes an auxiliary chamber 242, and filler neck connector 236 includes a passage 244.

Test head 232 includes a diverter valve 246, shown diagrammatically in FIG. 3, that can be moved between a cap-testing first position and a system-testing second position to enable a leakage test is to be performed either on closure cap 16 or the remainder of fuel system 17. When diverter valve 246 is adjusted to lie in the first position, passage 244 is isolated from main chamber 240 and auxiliary chamber 242 is in fluid communication with main chamber 240 so that a leakage test can be performed on closure cap 16. When diverter valve 246 is adjusted to lie in the second position, auxiliary chamber 242 is isolated from main chamber 240 and passage 244 is in fluid communication with main chamber 240 so that a leakage test can be performed on the remainder of fuel system 17.

Fuel system leakage detector 210 includes a filler neck adapter (not shown), similar to filler neck adapter 48 of leakage detector 10, and a cap adapter (not shown), similar to cap adapter 50 of leakage detector 10. Filler neck connector 236 of test head 232 is formed to include an external thread 252. The filler neck adapter is used to couple test head 232 to filler neck 20 in the same manner that filler neck adapter 48 is used to couple test head 32 to filler neck 20 and the cap adapter cooperates with closure cap connector 238 to provide a cap-support fixture 251 for closure cap 16 in the same manner that cap adapter 50 cooperates with closure cap connector 38 to provide capsupport fixture 51 for closure cap 16.

Fuel system leakage detector 210 includes a pressurized gas source 264 as shown in FIG. 3. Gas source 264 includes a gas tank 265, which in preferred embodiments is a tank of Nitrogen gas, although any inert gas could be used. Gas source 264 further includes a master pressure regulator 270 which, in preferred embodiments, is rated at ten pounds per square inch (68.95 kPa), and a supply line 266 extending from gas tank 265 to pressure regulator 270.

Leakage detector 210 includes a pneumatic circuit 277 that couples gas source 264 to test head 232 as shown in FIG. 3. Pneumatic circuit 277 also includes a pneumatic coaxial hose 272 having a first line 274 and a second line 276, each of which extends from test head 232 and each of which is coupled fluidly to main chamber 240 formed in body 234. Pneumatic circuit 277 further includes a first gas flow path (indicated by arrows 212), a second gas flow path (indicated by arrows 213), and a third gas flow path (indicated by arrows 214). Each gas flow path 212, 213, 214 couples pressure regulator 270 to first line 274 of pneumatic hose 272. Second line 276 of pneumatic hose 272 is coupled to an analog pressure switch 278. The end of second line 276 that is coupled to pressure switch 278 is closed so that no gas flows through second line 276. Thus, second line 276 is a pressure-sensing line 276 for use in sensing pressure in chamber 240 during various phases of the cap and fuel system leakage tests.

Leakage detector 210 further includes a pneumatic circuit bypass 279 coupled to output line 294. Pneumatic circuit bypass 279 also includes first line 274 of pneumatic hose 72 to provide a bypass path (indicated by arrows 211) around pneumatic circuit 277 from gas source 264 to test head 232.

At least one gas flow valve (represented by squares in FIG. 3) is included in each gas flow path 211, 212, 213, 214 of pneumatic circuit 277. Each gas flow valve is operable to open and close using solenoids or any suitable remote control valve actuator. According to the preferred embodiment of the present invention, the valves are open/closed solenoid valves.

Leakage detector 210 further includes a control network 281 including an electric circuit 283, a gas flow valve control apparatus 295, and a signaling device 287. Electric circuit 283 receives input signals on electric signal line 285 extending from pressure switch 278 to indicate that predetermined pressures associated with switch 278 have been reached in main chamber 240. Electric circuit 283 also receives an input signal on an electric signal line 291 extending from test head 232 to indicate whether a cap leakage test or a fuel system leakage test is to be performed. Leakage detector 210 also includes an actuation button 293 that is coupled to electric circuit 283 and that is actuated by an operator when a leakage test is to be performed.

Electric circuit 283 is coupled electrically to each gas flow valve 296, 300, 318, 33 8, 348, 372, 380 by a gas flow valve signal apparatus 295 as shown diagrammatically in FIG. 3. Each gas flow valve is normally in a closed position blocking the flow of gas therethrough. Based on the input signals received on signal line 285 and received from actuation button 293, electric circuit 283 sends output signals through signal apparatus 295 to appropriate gas flow valves to move the appropriate gas flow valves to opened positions from the respective closed positions thereby allowing gas to flow therethrough.

Pneumatic circuit 277 includes a line 288 and a line 292, each of which extend from master pressure regulator 270 as shown in FIG. 3. Line 288 is included in first and second gas flow paths 211, 212 and line 292 is included in third and fourth gas flow paths 213, 214. First line 274 of pneumatic hose 272 is included in each gas flow path 211, 212, 213, 214.

Bypass path 211 includes a line 290 extending from line 288 and coupling to a first tank-charge gas flow valve 296 which is included in bypass path 211 as well. Bypass path 211 further includes a line 298 that couples first tank-charge gas flow valve 296 to a second tank-charge gas flow valve 300 also included in bypass path 211. Bypass path 211 includes a line 310 that couples gas flow valve 300 to a line 311 which is included in gas flow paths 211, 212. Line 311 couples to a first outlet gas flow valve 338 that is also included in gas flow paths 211, 212. Gas flow valve 338 is coupled to first line 274 of pneumatic hose 272 by a line 312 which is included in gas flow paths 211, 212 as well.

A mechanical pressure-relief valve 314 is coupled to line 298 between gas flow valves 296, 300. Gas flow valve 296 is a 3-way gas flow valve having a first position, in which gas is blocked from flowing therethrough, a second position, in which gas is permitted to flow from line 290 to line 298, and a vent position, in which gas is permitted to flow from line 298 to the atmosphere as indicated by arrow 313 extending from gas flow valve 296. Gas flow valve 296 is signaled by electric circuit 283 through signal apparatus 295 to move to the vent position when pressure switch 278 closes due to the pressure in chamber 240 reaching a predetermined pressure, which, in preferred embodiments, is between thirty-one inches of water (7.72 kPa) and forty inches of water (9.96 kPa). When pressure switch 278 closes, electric circuit 283 sends signals through apparatus 295 to close all valves except valves 296, 300, 338 so that pressurized gas vents from chamber 240 though valves 296, 300; 338 to the atmosphere. Pressure-relief valve 314 is normally in a closed position and opens at forty inches of water (9.96 kPa). Pressure-relief valve 314 is provided as a back-up in case, for some reason, gas flow valve 296 does not move to the vent position when chamber 240 reaches the predetermined pressure at which pressure switch 278 should close.

Gas flow path 212 of pneumatic circuit 277 includes a line 294 extending from line 288 and coupling to a first inlet gas flow valve 318 which is included in gas flow path 212 as well. Gas flow path 212 includes a line 320 extending from gas flow valve 318 and coupling to a low pressure regulator 316 which is also included in gas flow path 212. A line 322 is included in gas flow path 212 and couples pressure regulator 316 to a pneumatic bridge 284, which is also included in gas flow path 212. Gas flow path 212 further includes a line 340 that couples bridge 284 to line 311 which, in turn, couples to gas flow valve 338 as previously described. In addition, gas flow valve 338 couples to first line 274 of pneumatic hose 272 through line 312 as also previously described.

Bridge 284 measures a pressure that corresponds to the leakage rate of fuel system 17 when pressurized gas from gas source 264 flows through bridge 284. Bridge 284 includes a first passage 324 with a first control orifice 326 and a second passage 328 with a second control orifice 330. Passages 324, 328 are each in fluid communication with line 322. Bridge 284 further includes an outlet passage 332 with a master orifice 334. Outlet passage 332 is in fluid communication with first passage 324. Outlet passage 332 is also in fluid communication with the atmosphere. Second passage 328 of bridge 284 is coupled to line 140.

Bridge 284 includes a pressure indicator 336 which is coupled fluidly to first and second passages 324, 328 as shown in FIG. 3. In preferred embodiments, pressure indicator 336 is a differential-pressure transducer that includes a sensor 337 that detects pressure differences between first and second passages 324, 328 on the outlet side of respective control orifices 326, 330 and a signal generator 339 that provides a fuel system leakage signal to electric circuit 283 derived from the difference in pressure in the first and second passages 324, 328. Electric circuit 283 is configured to determine whether fuel system 17 passes or fails the leakage test based on the signal provided by pressure indicator 336 and activate signaling device 287 to communicate information derived from the signal sent by signal generator 339. Electric circuit 283 and bridge 284 of leakage detector 210 operate in a manner similar to electric circuit 83 and bridge 84 of leakage detector 10.

Line 292, which is included in gas flow paths 213, 214 as previously described, couples to a second inlet gas flow valve 348 which is also included in gas flow paths 213, 214. Gas flow paths 213, 214 also include a line 346 that couples to a high-pressure regulator 344 included in gas flow paths 213, 214 as well. Gas flow path 213 includes a line 378 that extends from pressure regulator 344 and couples to a cap-charge gas flow valve 380 of gas flow path 213. Gas flow path 213 also includes a line 382 that couples gas flow valve 380 to a line 375 which is included in gas flow paths 213, 214. Line 375 couples to a second outlet gas flow valve 372 that is also included in gas flow paths 213, 214. Gas flow valve 372 is coupled to first line 274 of pneumatic hose 272 by a line 376 which is included in gas flow paths 213, 214 as well.

Gas flow path 214 includes a line 356 that couples pressure regulator 344 to a pneumatic bridge 286, which is also included in gas flow path 214. Gas flow path 214 further includes a line 374 that couples bridge 286 to line 375 which, in turn, couples to gas flow valve 372 as previously described. In addition, gas flow valve 372 couples to first line 274 of pneumatic hose 272 through line 376 as also previously described.

Bridge 286 measures a pressure that corresponds to the leakage rate of closure cap 16 when pressurized gas from gas source 264 flows through bridge 286. Bridge 286 includes a first passage 358 with a first control orifice 360 and a second passage 362 with a second control orifice 364 as shown in FIG. 3. Passages 358, 362 are each in fluid communication with line 356. Bridge 286 further includes an outlet passage 366 with a master orifice 368. Outlet passage 366 is in fluid communication with first passage 358. Outlet passage 366 is also in fluid communication with the atmosphere. Second passage 362 of bridge 286 is coupled to line 374.

Bridge 286 includes a pressure indicator 370 which is coupled fluidly to first and second passages 358, 362 as shown in FIG. 3. In preferred embodiments, pressure indicator 370 is a differential-pressure transducer includes a sensor 371 that detects pressure differences between first and second passages 358, 362 on the outlet side of respective control orifices 360, 364 and a signal generator 373 that provides a cap leakage signal to electric circuit 283 derived from the difference in pressure in first and second passages 358, 362. Electric circuit 283 is configured to determine whether closure cap 16 passes or fails the leakage test based on the signal provided by pressure indicator 370 and activate signaling device 87 to communicate information derived from the signal sent by signal generator 373. Electric circuit 283 and bridge 286 operate in a manner substantially similar to the manner in which the electric circuit 283 and bridge 284 operate.

Thus, bridges 284, 286 cooperate to provide a measurement device that senses leakage characteristics of closure cap 16 and the remainder of fuel system 17. The measurement device then sends a signal to control network 281 that activates signaling device 287 to inform a user of the leakage test results.

In use, electric circuit 283 provides a software prompt to an operator to install the appropriate filler neck adapter on filler neck connector 236 of test head 232 and then to install the filler neck adapter in open end 22 of filler neck 20 or to install filler neck connector 236 of test head 232 to filler neck 20 directly, thereby coupling test bead 232 to filler neck 20. The software prompt from electric circuit 283 also instructs the operator to install closure cap 16 in cap-support fixture 251, thereby coupling closure cap 16 to test head 232. The operator also clamps line 25 extending between valve 26 and canister 24 with a suitable device such as a pair of vice grips (not shown) so that, during the leakage test, pressurized gas is prevented from leaking into canister 24 and then into engine 21.

In preferred embodiments, electric circuit 283 of leakage detector 210 includes a microprocessor (not shown) and associated components (not shown) such as one or more of a ROM chip, a RAM chip, a clock or oscillator, an analog-to-digital converter, and signal-conditioning circuitry as was the case with electric circuit 83 of leakage detector 10. Signaling device 287 includes various indicators (not shown) such as PASS and FAIL LED's. According to alternative embodiments, other indicators such as LED screens, monitors, light bulbs, speakers, or dial gauge faces, are used for the signaling device. After line 25 is clamped and after test head 232 and closure cap 16 are coupled properly to filler neck 20 and cap-support fixture 251, respectively, the operator actuates button 293 so that software in the memory of electric circuit 283 is executed.

Before a leakage test is performed, all gas flow valves 296, 300, 318, 338, 348, 372, 380 are in the respective closed positions. When the operator presses and holds button 293, after closure cap 16 is coupled to test head 232, electric circuit 283 sends output signals through apparatus 295 to open gas flow valves 348, 380, 372. Master pressure regulator 270 is configured to provide a constant pressure of ten psi (68.95 kPa) in line 292 and high-pressure regulator 344 is configured to provide a constant pressure of thirty inches of water (7.47 kPa) in lines 356, 378. Each pressure regulator 270, 344 is a commercially available pressure regulator that provides a respective constant pressure level independent of the flow rate of gas therethrough.

After gas flow valves 348, 372, 380 are opened, pressurized gas from gas source 264 flows through pressure regulators 270, 344 and lines 292, 346, 378, 382, 375, 376, 274 into chamber 240 of test head 232 to charge test head 232 and closure cap 16. Pressurized gas also flows into auxiliary chamber 242 because diverter valve 246 is in the second position fluidly coupling chamber 240 with chamber 242 due to cap 16 being coupled to cap-support fixture 251. As pressurized gas flows into chambers 240, 242, the pressure in each of chambers 240, 242 increases and this pressure increase is conmnunicated to pressure switch 278 via pressure-sensing line 276.

When the pressure in chambers 240, 242 reaches twenty-nine inches of water (7.22 kPa), pressure switch 278 sends an input signal on line 285 to electric circuit 283. The input signal from pressure switch 278 causes electric circuit 283 to send an output signal through apparatus 295 to close gas flow valve 380. According to an alternative embodiment, line 378, cap-change flow valve 380, and line 382 are not provided and test head 332 and closure cap 16 are charged through gas flow path 214 or bypass path 211. According to another alternative embodiment, complementary valves are combined into a single valve. For example, gas flow valves 372, 380 are replaced by a single valve (not shown) that switches between opening and closing flow paths 14 and 15.

While gas flow valves 348, 372, 380 are opened allowing chambers 240, 242 to charge with pressurized gas, some pressurized gas is able to reach bridge 286 and leak to the atmosphere through passages 358, 366 and orifices 360, 368. However, it should be understood that orifices 360, 368 are small in size compared to the size of, for example, lines 378, 382 and the size of passages (not shown) of gas flow valves 380, 372 so that the amount of pressurized gas that leaks to the atmosphere through orifices 360, 368 is a relatively small amount compared to the amount of pressurized gas that flows to chambers 240, 242. Thus, chambers 240, 242 are able to charge to twenty-nine inches of water (7.22 kPa) in a short amount of time even though some pressurized gas leaks to the atmosphere through bridge 286.

After gas flow valve 380 closes due to chambers 240, 242 being charged to the predetermined pressure, gas flow valves 348, 372 remain open and pressurized gas no longer flows through gas flow path 213 but, instead, flows only through gas flow path 214 which includes bridge 286 having passages 358, 362. The gas flowing through passage 358 also flows through orifice 360 and then flows through outlet passage 366 and master orifice 368 to the atmosphere. The gas flowing through passage 362 also flows through orifice 364 and then through, in sequence, line 374, line 375, gas flow valve 372, fines 376, 274, and chambers 240, 242, where the pressurized gas ultimately leaks through closure cap 16 to the atmosphere. Thus, during the cap leakage test, gas source 264 causes pressurized gas to flow through orifice 360 and master orifice 368 to the atmosphere and gas source 264 also causes pressurized gas to flow through orifice 364 and any leaks in closure cap 16 to the atmosphere.

Master orifice 368 is configured to allow pressurized gas to pass therethrough at the maximum acceptable leakage rate for closure cap 16. Orifices 360, 364 and passages 358, 362 are similarly sized so that if the leakage rate of closure cap 16 is substantially equivalent to the leakage rate of master orifice 368, a substantially equivalent amount of pressurized gas will pass through orifices 360, 364 and passages 358, 362. If the leakage rate of closure cap 16 is substantially equivalent to the leakage rate of master orifice 368, pressure sensor 371 will sense that the pressures in passages 358, 362 are substantially equivalent. If the leakage rate of closure cap 16 is below the leakage rate of master orifice 368, pressure sensor 371 will sense that the pressure in passage 362 is greater than the pressure in passage 358 and closure cap 16 will "pass" the leakage test. If the leakage rate of closure cap 16 is above the leakage rate of master orifice 368, pressure sensor 371 will sense that the pressure in passage 362 is less than the pressure in passage 358 and closure cap 16 will "fail" the leakage test.

In preferred embodiments, leakage detector 210 is configured so that the entire closure cap leakage test takes place in approximately ten seconds. In addition, the software of electric circuit 283 is written so that the pressure differential between passages 358, 362, which is indicated by pressure indicator 370 as an analog voltage signal, is sampled three seconds after gas flow valve 380 is closed. The analog voltage signal is converted to a digital equivalent which is compared to a threshold value stored in the memory of electric circuit 283. Based on the comparison, electric circuit 283 will send an output signal either to actuate signaling device 287 to indicate a PASS, if closure cap 16 passes the leakage test, or indicate a FAIL, if closure cap 16 fails the leakage test. After the results of the closure cap leakage test have been indicated, electric circuit 283 sends output signals through apparatus 295 to close all gas flow valves 296, 300, 318, 338, 348, 372, 380. The operator is then signaled by signaling device 287 with an audible prompt that indicates to the operator that the button 293 no longer should be pressed and that closure cap 16 and the cap adapter should be removed from closure cap connector 238 of test head 232.

After the operator removes closure cap 16 and the cap adapter from receptacle 238 when the cap leakage test is finished, leakage detector 210 proceeds automatically to test the leakage rate of the remainder of the fuel system 17. Electric circuit 283 provides a software prompt indicating that a "tank test" is in progress. During the tank test, electric circuit 283 sends output signals through apparatus 295 to open gas flow valves 296, 300, 318, 338. After gas flow valves 296, 300, 318, 338 are opened, a large amount of pressurized gas from gas source 264 flows through pressure regulator 270, lines 288, 290, 298, 310, 311, 312, 274 and gas flow valves 296, 300, 338 into chamber 240 of test head 232 and a small amount of pressurized gas from gas source 264 flows through pressure regulator 316 and lines 294, 320, 322 to reach bridge 284 at which point some of the small amount of gas leaks to the atmosphere from bridge 284 and some of the small amount of gas flows from bridge 284 to chamber 240 through lines 340, 311, 312, 274. As pressurized gas flows into chamber 240, pressurized gas also flows through passage 244 into filler neck 20 and fuel tank 18 because diverter valve 246 is in the first position fluidly coupling chamber 240 with passage 244 due to cap 16 and the cap adapter being decoupled from receptacle 238.

Master pressure regulator 270 is configured to provide a constant pressure of ten psi (68.95 kPa) in lines 288, 292 independent of the flow rate of gas therethrough as previously described. Pressure regulator 270 is configured so that, chamber 240, passage 244, filler neck 20, and fuel tank 18 are charged rapidly with pressurized gas from gas source 264. As pressurized gas flows rapidly into each of chamber 240, passage 244, filler neck 20, and fuel tank 18, the pressure in chamber 240 increases and this pressure increase is communicated to pressure switch 278 via pressure-sensing line 276. When the pressure in chamber 240 reaches 14.5 inches of water (3.61 kPa), pressure switch 278 sends an input signal on signal line 285 to electric circuit 283. The input signal from pressure switch 278 causes electric circuit 283 to send output signals through apparatus 295 to close gas flow valve 300 and then to close gas flow valve 296. After gas flow valves 296, 300 close, gas flow valves 318, 338 remain open so that pressurized gas reaches bridge 284 through gas flow path 212. Pressure regulator 316 is configured so that the pressure in line 322 is substantially constant at 14.5 inches of water (3.61 kPa).

After gas flow valves 296, 300 close leaving gas flow valves 318, 338 open when chamber 240, filler neck 20, and fuel tank 18 are charged to the predetermined pressure as determined by pressure switch 278, pressurized gas no longer flows through bypass path 211 but, instead, flows along gas flow path 212 from line 322 into passages 328, 324 of bridge 284. The gas flowing through passage 324 also flows through orifice 326 and then flows through outlet passage 332 and master orifice 334 to the atmosphere. The gas flowing through passage 328 also flows through orifice 330 and then through, in sequence, lines 340, 311, gas flow valve 338, lines 312, 274, chamber 240, passage 244, filler neck 20, and fuel tank 18 where the pressurized gas ultimately leaks to the atmosphere through any leaks that exist in filler neck 20 and fuel tank 18. Thus, during the fuel system leakage test, gas source 264 causes pressurized gas to flow through orifice 326 and master orifice 334 to the atmosphere and gas source 264 also causes pressurized gas to flow through orifice 330 and any leaks in filler neck 20 and fuel tank 18 to the atmosphere.

Master orifice 334 is configured to allow pressurized gas to pass therethrougb at the maximum acceptable leakage rate for fuel tank 18 and filler neck 20. Orifices 326, 330 and passages 324, 328 are similarly sized so that if the leakage rate of fuel tank 18 and filler neck 20 is substantially equivalent to the leakage rate of master orifice 334, a substantially equivalent amount of pressurized gas will pass through orifices 326, 330 and passages 324, 328. If the leakage rate of fuel tank 18 and filler neck 20 is substantially equivalent to the leakage rate of master orifice 334, pressure sensor 336 will sense that the pressures in passages 324, 328 are substantially equivalent. If the leakage rate of fuel tank 18 and filler neck 20 is below the leakage rate of master orifice 334, pressure indicator 336 will sense that the pressure in passage 328 is greater than the pressure in passage 324 and fuel tank 18 and filler neck 20 will pass the leakage test. If the leakage rate of fuel tank 18 and filler neck 20 is above the leakage rate of master orifice 334, pressure indicator 336 will sense that the pressure in passage 328 is less than the pressure in passage 324 and fuel tank 18 and filler neck 20 will fail the leakage test.

In preferred embodiments, the software of electric circuit 283 is written so that the pressure differential between passages 324, 328, which is indicated by pressure indicator 336 as an analog voltage signal, is sampled five to ten seconds after gas flow valves 296, 300 are closed. The analog voltage signal is converted to a digital equivalent which is compared to a threshold value stored in the memory of electric circuit 283. Based on the comparison, electric circuit 283 will send an output signal either to actuate the PASS indicator, if fuel tank 18 and filler neck 20 pass the leakage test, or to actuate the FAIL indicator, if fuel tank 18 and filler neck 20 fail the leakage test.

After the results of the fuel system leakage test have been indicated, the operator is prompted by electric circuit 283 that the fuel system leakage test is finished and electric circuit 283 sends output signals through apparatus 295 to close all gas flow valves 296, 300, 318, 338, 348, 372, 380. The operator then decouples test head 232 and the filler neck adapter from filler neck 20, thereby concluding the fuel system leakage test.

Thus, leakage detector 210 includes lines 288, 290, 298, 310, 311, 312, 274; and gas flow valves 296, 300, 338 that provide bypass path 211 through which fuel system 17 is charged with pressurized gas from gas source 264 when gas flow valves 348, 372, 380 and mechanical pressure-relief valve 314 are closed. Leakage detector 210 includes pressure regulator 316; lines 288, 294, 320, 322, 340, 311, 312, 274; gas flow valves 318, 338; and bridge 284 that provide second gas flow path 212 through which pressurized gas from gas source 264 flows at low pressure to test fuel system 17 for leaks when gas flow valves 296, 300, 348, 372, 380 are closed. In addition, leakage detector 210 includes pressure regulator 344; lines 292, 346, 378, 382, 375, 376, 274; and gas flow valves 348, 372, 380 that provide third gas flow path 213 through which chambers 240, 242 are charged with pressurized gas from gas source 264 when gas flow valves 296, 300, 318, 338 are closed and closure cap 16 is coupled to cap-support fixture 251. Finally, leakage detector 210 includes pressure regulator 344; lines 292, 346, 356, 374, 375, 376, 274; gas flow valves 348, 372; and bridge 286 that provide fourth gas flow path 214 through which pressurized gas from gas source 264 at high pressure to test closure cap 16 for leaks when gas flow valves 296, 300, 318, 338, 380 are closed and closure cap 16 is coupled to cap-support fixture 251.

Although the invention has been described above with reference to certain preferred embodiments, variations and modifications exist within the scope and spirit of the invention.

What is claimed is:

1. A fuel system leakage detector comprising a pressure source providing pressurized gas, a test head including a filler connector adapted to couple to a filler neck of a fuel system and a cap connector adapted to couple to a closure cap of the fuel system, and a pneumatic circuit coupled to the pressure source and the test head, the pneumatic circuit including a conduit coupled to the pressure source and the test head and a measurement device coupled to the conduit, the measurement device including a first indicator and a second indicator, the first indicator being in fluid communication with the filler neck connector of the test head through the conduit to detect leakage characteristics related to the fuel system being tested, the second indicator being in fluid communication with the cap connector portion of the test head through the conduit to detect leakage characteristics related to the closure cap being tested.

2. The fuel system leakage detector of claim 1, wherein one of the first and second indicators is included in a pressure bridge including a first passage in fluid communication with the pressure source, a master orifice positioned to lie in the first passage, a first control orifice positioned to lie in the first passage between the pressure source and the master orifice, a second passage in fluid communication with the pressure source and the test head, and a second control orifice positioned to lie in the second passage, said indicator is coupled to the first passage between the first control orifice and the master orifice and to the second passage between the second control orifice and the test head.

3. The fuel system leakage detector of claim 1, wherein the first indicator is included in a first pressure bridge, the second indicator is included in a second pressure bridge, and each pressure bridge includes a first passage in fluid communication with the pressure source, a master orifice positioned to lie in the first passage, a first control orifice positioned to lie in the first passage between pressure source and the master orifice, a second passage in fluid communication with the pressure source and the test head, and a second control orifice positioned to lie in the second passage, and each indicator is coupled to the first passage between the first control orifice and the master orifice and to the second passage between the second control orifice and the test head.

4. The fuel system leakage detector of claim 3, wherein the master orifice of the first pressure bridge has an inner perimeter defining a first flow area and the master orifice of the second pressure bridge has an inner perimeter defining a second flow area that is larger than the first flow area.

5. The fuel system leakage detector of claim 3, wherein the pneumatic system further includes a valve configured to move between a first position permitting the flow of gas to the filler neck connector of the test head and blocking the flow of gas to the closure cap connector of the test head and a second position permitting the flow of gas to the closure cap connector of the test head and blocking the flow of gas to the filler neck connector of the test head.

6. A fuel system leakage detector comprising a pressure source providing pressurized gas, a test head including a filler neck connector adapted to couple to the filler neck of a fuel system and a cap connector adapted to couple to a closure cap of the fuel system, a pneumatic circuit including a conduit coupled to the pressure source and the test head and a measurement device coupled to the conduit to detect leakage characteristics related to the fuel system component being tested, and a valve positioned to move between a first position blocking the flow of gas to the filler neck connector of the test head and permitting the flow of gas to the cap connector of the test head during testing of the closure cap and a second position blocking the flow of gas to the cap connector of the test head and permitting the flow of gas to the filler neck connector of the test head durng testing of the remainder of the fuel system.

7. The fuel system leakage detector of claim 6, wherein the valve is positioned to lie in the test head.

8. The fuel system leakage detector of claim 6, wherein the test head is T-shaped.

9. The fuel system leakage detector of claim 6, further comprising an adapter and wherein the adapter includes a first connector configured to couple to the at least one of the filler neck connector and the cap connector of the test head and a second connector configured to couple to at least one of a different closure cap and a different filler neck of a different fuel system.

10. The fuel system leakage detector of claim 6, wherein the measurement device includes first and second indicators, the first indicator is in fluid communication with the cap connector of the test head through the conduit when the valve is in the first position and the second indicator is in fluid communication with the filler neck connector of the test head through the conduit when the valve is in the second position.

11. The fuel system leakage detector of claim 6, further comprising an electric circuit coupled to the valve and programmed to automatically move the valve between the first and second positions between testing of the closure cap and the remainder of the fuel system.

12. A fuel system leakage detector comprising a pressure source providing pressurized gas, a test head including a body and a connector adapted to couple to a component of a fuel system, and a pneumatic circuit including a conduit coupled to the test head and the pressure source, a measurement device coupled to the conduit to detect leakage characteristics related to the fuel system component being tested, a first pressure regulator supplying gas at first pressure level to the test head, and a second pressure regulator supplying gas to the test head at a second pressure level that is different than the first pressure level, and the pneumatic circuit further includes a first pneumatic line coupled to the first pressure regulator and the measurement device and a valve coupled to the first pneumatic line to move between a first position blocking the flow of gas from the first pressure regulator to the measurement device and a second position permitting the flow gas from the first pressure regulator to the measurement device.

13. The fuel system leakage detector of claim 12, wherein the pneumatic circuit further includes a second pneumatic line coupled to the second pressure regulator and the measurement device and a valve coupled to the second pneumatic line to move between a first position blocking the flow of gas from the second pressure regulator to the measurement device and a second position permitting the flow gas from the second pressure regulator to the measurement device.

* * * * *